US005182721A

United States Patent [19]
Kipphan et al.

[11] Patent Number: 5,182,721
[45] Date of Patent: Jan. 26, 1993

[54] PROCESS AND APPARATUS FOR CONTROLLING THE INKING PROCESS IN A PRINTING MACHINE

[75] Inventors: Helmut Kipphan, Schwetzingen; Gerhard Löffler, Walldorf, both of Fed. Rep. of Germany; Guido Keller, Zürich; Hans Ott, Regensdorf, both of Switzerland

[73] Assignees: Heidelberger Druckmaschinen Aktiengesellschaft, Fed. Rep. of Germany; Gretak Aktiengesellschaft, Switzerland

[21] Appl. No.: 590,060

[22] Filed: Sep. 28, 1990

Related U.S. Application Data

[63] Continuation of Ser. No. 213,000, Jun. 29, 1988, abandoned, which is a continuation-in-part of Ser. No. 939,966, Dec. 10, 1986, abandoned.

[30] Foreign Application Priority Data

Dec. 10, 1985 [CH] Switzerland ........................ 5262/85

[51] Int. Cl.[5] ........................ G01J 3/46; G06F 15/20
[52] U.S. Cl. ..................................... 364/526; 356/407
[58] Field of Search ........................ 364/526, 525, 578; 101/365, 211, 171; 356/425, 421, 407, 402

[56] References Cited

U.S. PATENT DOCUMENTS

| | | | |
|---|---|---|---|
| 3,322,025 | 5/1967 | Dauser | 101/426 |
| 3,958,509 | 5/1976 | Murray et al. | 101/426 |
| 3,995,958 | 12/1976 | Pfahl et al. | 101/426 |
| 4,003,660 | 1/1977 | Christie, Jr. et al. | 356/407 |
| 4,076,412 | 2/1978 | Kishner | 356/96 |
| 4,151,796 | 5/1979 | Uhrig | 101/142 |
| 4,183,657 | 1/1980 | Ernst et al. | 355/14 R |
| 4,185,920 | 1/1980 | Suga | 356/406 |
| 4,200,932 | 4/1980 | Schramm et al. | 364/579 |
| 4,210,078 | 7/1980 | Greiner et al. | 101/136 |
| 4,210,818 | 7/1980 | Green et al. | 250/559 |
| 4,217,648 | 8/1980 | Thurm et al. | 364/526 |
| 4,256,131 | 3/1981 | De Remigis | 137/3 |

(List continued on next page.)

FOREIGN PATENT DOCUMENTS 1199521 1/1986 Canada .
1206803 7/1986 Canada .

(List continued on next page.)

OTHER PUBLICATIONS

"Matrix Algebra for Colorimetrists" by Eugene Allen in Color Engineering Jul.-Aug. Issue, 1966, 6 pages.
"Spectrodensitometry: A New Approach to Color Image Analysis" by C. S. McCamy, Proceedings Tokyo Symposium'77 on Photo-& Electro-Imaging ©1978 pp. 163-168.
"Specification and Control of Process Color Images by Direct Colorimetric Measurement" by Robert P. Ma- (List continued on next page.)

*Primary Examiner*—Kevin J. Teska
*Assistant Examiner*—Ellis B. Ramirez
*Attorney, Agent, or Firm*—Burns, Doane, Swecker & Mathis

[57] ABSTRACT

To improve the control of the inking process in an offset printing machine, color measuring fields provided on printed sheets are evaluated not as heretofore densitometrically but colorimetrically by means of spectral measurements. Spectral reflections are used to match colors, or color coordinates are calculated from them and compared with corresponding set reflections or set color coordinates. The color deviations obtained in this manner are used to control the inking process. For the stabilization of printing runs the spectral reflections are converted into filter color densities and the inking process is controlled on the basis of these color densities in a conventional manner. The control of the inking process using color deviations and control using color denisty may be superposed upon each other. The process makes it possible to adapt color impressions in delicate locations of importance for the image in the print to the corresponding locations of the proof. Color deviations due to different material properties and other error sources may also be equalized to some extent.

37 Claims, 6 Drawing Sheets

U.S. PATENT DOCUMENTS

| | | | |
|---|---|---|---|
| 4,289,405 | 9/1981 | Tobias | 356/407 |
| 4,309,496 | 1/1982 | Miller | 430/30 |
| 4,310,248 | 1/1982 | Meredith | 356/402 |
| 4,390,958 | 6/1983 | Mamberer | 101/365 |
| 4,403,866 | 9/1983 | Falcoff et al. | 366/132 |
| 4,439,038 | 3/1984 | Mactaggart | 356/408 |
| 4,488,808 | 12/1984 | Kato | 356/73 |
| 4,494,875 | 1/1985 | Schramm et al. | 356/402 |
| 4,505,589 | 3/1985 | Ott et al. | 356/402 |
| 4,510,866 | 4/1985 | Sekizawa et al. | 101/365 |
| 4,527,897 | 7/1985 | Okabe | 356/407 |
| 4,535,413 | 8/1985 | Shiota et al. | 364/526 |
| 4,539,647 | 9/1985 | Kaneko et al. | 364/526 |
| 4,541,336 | 9/1985 | Bernauer | 101/211 |
| 4,553,033 | 11/1985 | Hubble, III et al. | 250/353 |
| 4,561,103 | 12/1985 | Horiguchi et al. | 356/71 |
| 4,586,148 | 4/1986 | Rehder et al. | 364/550 |
| 4,649,502 | 3/1987 | Keller et al. | 364/519 |
| 4,660,159 | 4/1987 | Ott | 364/526 |
| 4,665,496 | 5/1987 | Ott | 364/526 |
| 4,667,596 | 5/1987 | Dotzel et al. | 101/211 |
| 4,671,661 | 6/1987 | Ott | 364/526 |
| 4,706,206 | 11/1987 | Benoit et al. | 364/526 |
| 4,717,954 | 1/1988 | Fujita et al. | 358/80 |
| 4,752,892 | 6/1988 | Lecha | 364/518 |
| 4,813,000 | 3/1989 | Wyman et al. | 364/526 |
| 4,884,221 | 11/1989 | Sugiyama et al. | 364/526 |

FOREIGN PATENT DOCUMENTS

| | | |
|---|---|---|
| 069572 | 12/1983 | European Pat. Off. . |
| 2313528 | 3/1973 | Fed. Rep. of Germany . |
| 227094 | 8/1973 | Fed. Rep. of Germany . |
| 2012213 | 7/1979 | United Kingdom . |
| 2071573 | 9/1981 | United Kingdom . |
| 2107047 | 4/1983 | United Kingdom . |

OTHER PUBLICATIONS son, TAGA Proceedings 1985 pp. 526–545.

The International Organization for Standardization, International Standard May 3 publication, ©1984.

"Color In Business, Science and Industry" Deane B. Judd and Gunter Wyszecki, pp. 129–159 and 281–352.

"Heidelberg Speedmaster-Heidelberg M-Offset" operating manual.

The International Commission on Illumination Publication (i.e., Supplement No. 2 to CIE Publication No. 15 (e-1.3.1) 1971/(TC-1.3) 1978.

"A New Color Control System For Gravure" (Brand et al.) May 1987.

"Spectrophotometric Instrumentation For Graphic Arts" (Celio, 1988 TAGA Proceedings).

PROCESS AND APPARATUS FOR CONTROLLING THE INKING PROCESS IN A PRINTING MACHINE

RELATED APPLICATIONS

This application is a continuation of application Ser. No. 07/213,000, filed June 29, 1988 which is a continuation-in-part of U.S. Ser. No. 06/939,966, filed Dec. 10, 1986 which are now abandoned.

BACKGROUND OF THE INVENTION

The invention concerns a process for the control of inking in a printing machine, a printing plant suitable for the carrying out of the process and a measuring apparatus for the generation of the control data for such a printing plant.

In continuous printing the control of inking is the most important possibility of affecting the impression of the image. It is performed by visual evaluation or by means of a densitometric analysis of color measuring fields printed with the image. An example of the latter is described in German Patent Publication OS 27 28 738, which corresponds to U.S. Pat. No. 4,200,932.

More specifically, the color impression of an image printed in an offset printing machine is best regulated by control of the inking, i.e. control of the physical thickness of the color inks applied to the sheet of paper onto which the image is printed. Ink layer thicknesses can be controlled within certain given (narrow) limits, whereby thicker layers result in more saturated color impression or higher (full-tone) color densities, and vice versa. Full-tone color densities and thicknesses of ink layers are directly related and these terms are even often used synonymously. For the definition of color densities please refer to the literature on the subject, such as the International Standard Publication ISO 5/3-1984, "Photography-Density Measurements-Part 3: Spectral Conditions", First Edition-Aug. 15, 1984, International Organization for Standardization, which is hereby incorporated by reference.

Control of image impression is usually performed by means of special color measuring fields (color test fields, color test strip, color measuring strip) printed together with the image. The measuring fields are opto-electrically scanned and the color density values thereby obtained are compared with desired reference values, e.g. obtained from a so-called "O.K." sheet. Examples of color measuring fields and suitable (scanning) denistometers are described for example, in U.S. Pat. Nos. 3,995,958; 4,494,875; and 4,505,589 as well as in the many references cited in these patent specifications.

The control of the ink thicknesses is effected on the basis of the deviations of the measured color density values from the desired reference density values in such a way as to minimize these deviations. An example of an automatic closed-loop ink control system of this kind is described in the aforementioned U.S. Pat. No. 4,200,932. Other similar systems such as that shown in FIG. 1A have been on the market for many years, one of them being the "Heidelberg Speedmaster" system.

Offset printing presses generally work on a zonal basis, i.e. the printing width is divided into e.g. 32 printing zones each of which is controlled independently from the others (at least as far as the present invention is concerned). By means of a control panel various control functions of the printing press can be performed. For example, the control panel can be fed with color density deviation data (control data) and regulate the ink control elements in the printing press on the basis of these data in a manner such that prints produced after the corresponding regulating step have lower or—ideally—no density deviation as compared to desired reference color densities. The control panel can be fed with a suitable set of color density deviations such that one deviation is provided for each printing ink and for each printing zone (e.g. 3×32 density deviations in case of a three color printing press having 32 printing zones).

It has been discovered in actual practice, however, that the control of inking on the basis of densitometric measurements alone is often insufficient. Thus, it happens frequently that in the case of a setting for equal full-tone densities, appreciable color differences appear between proofs or proof substitutes, respectively, and production runs. These perceived color differences must then be corrected manually by the interactive adjustment of the ink controls. The causes of such differences in printed color may be found in the generally different production processes for proofs/substitute proofs and for production runs and in the color differences of the materials used. Furthermore, in the case of constant ink density printing and in particular full-tone density printing, constancy of the ink impression is not assured because variations of the tone value occur as the result of soiling of the rubber blanket or of other effects.

Thus, there is a need in the prior art for more suitable input control data for known printing control systems in order to achieve more satisfying ink control.

SUMMARY OF THE INVENTION

Accordingly, it is an object of the present invention to improve the control of inking in printing machines so that a higher degree of agreement between the image impression of proofs or proof substitutes and production runs is achieved. It is a further object that production prints remain stable relative to inking. It is a further object that variations in color are recognized.

These objects are attained by a process, a correspondingly equipped printing plant and a measuring apparatus in which spectral reflections from measured test areas are determined and control of the inking process is effected on the basis of these spectral reflections and the colorimetric data derived therefrom. In this manner, the image impressions, even in delicate locations that are important for the image, may be optimally reconciled in production runs with those of proofs or proof substitutes. Color deviations resulting from different value increments and other material and process effects may also be equalized to some extent. The color measurements themselves may be carried out on color test strips printed simultaneously with the images or on-suitably selected locations or test areas in the image.

BRIEF DESCRIPTION OF THE DRAWINGS

The invention will become more apparent from the detailed description hereinbelow read in conjunction with the drawings.

DETAILED DESCRIPTION

Figure 1A:
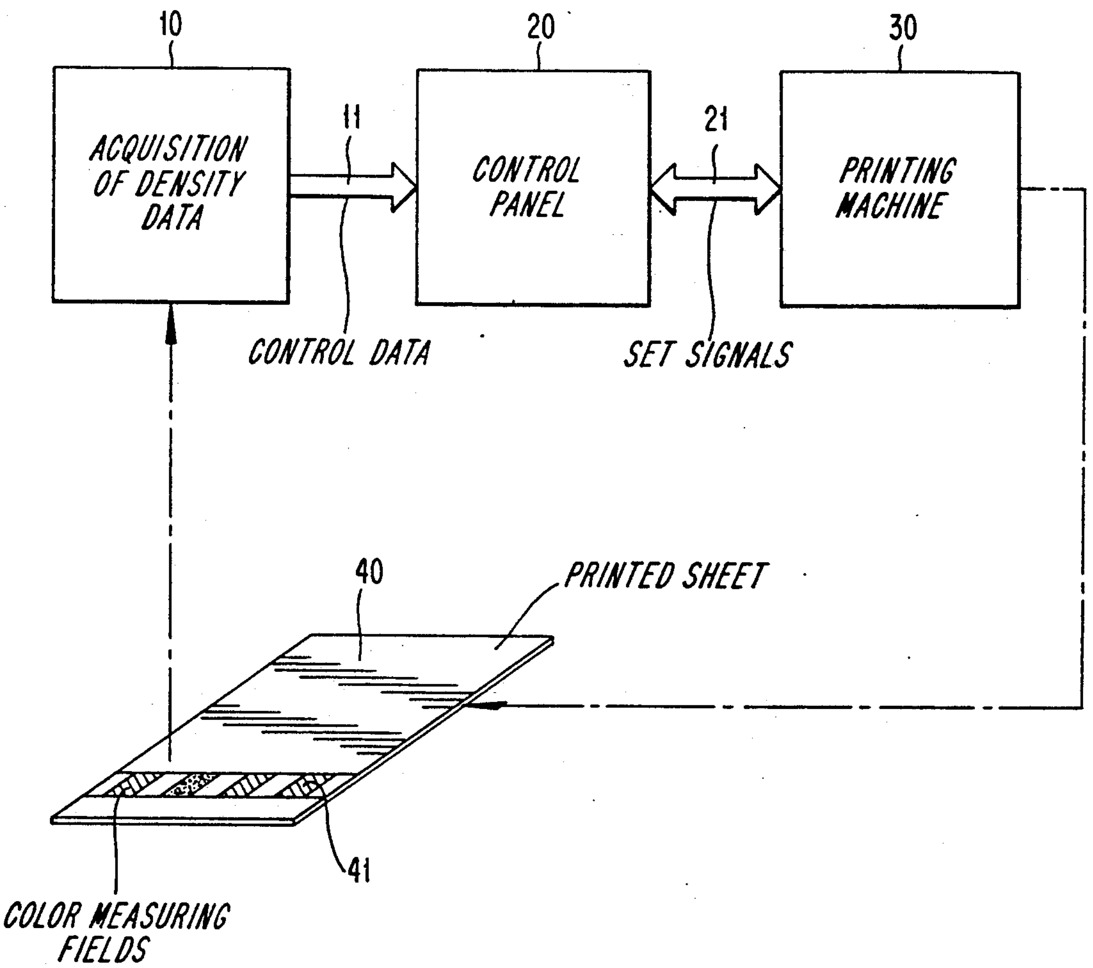
FIG. 1A PRIOR ART
FIG. 1A corresponds to a known printing plant.
Figure 1B:
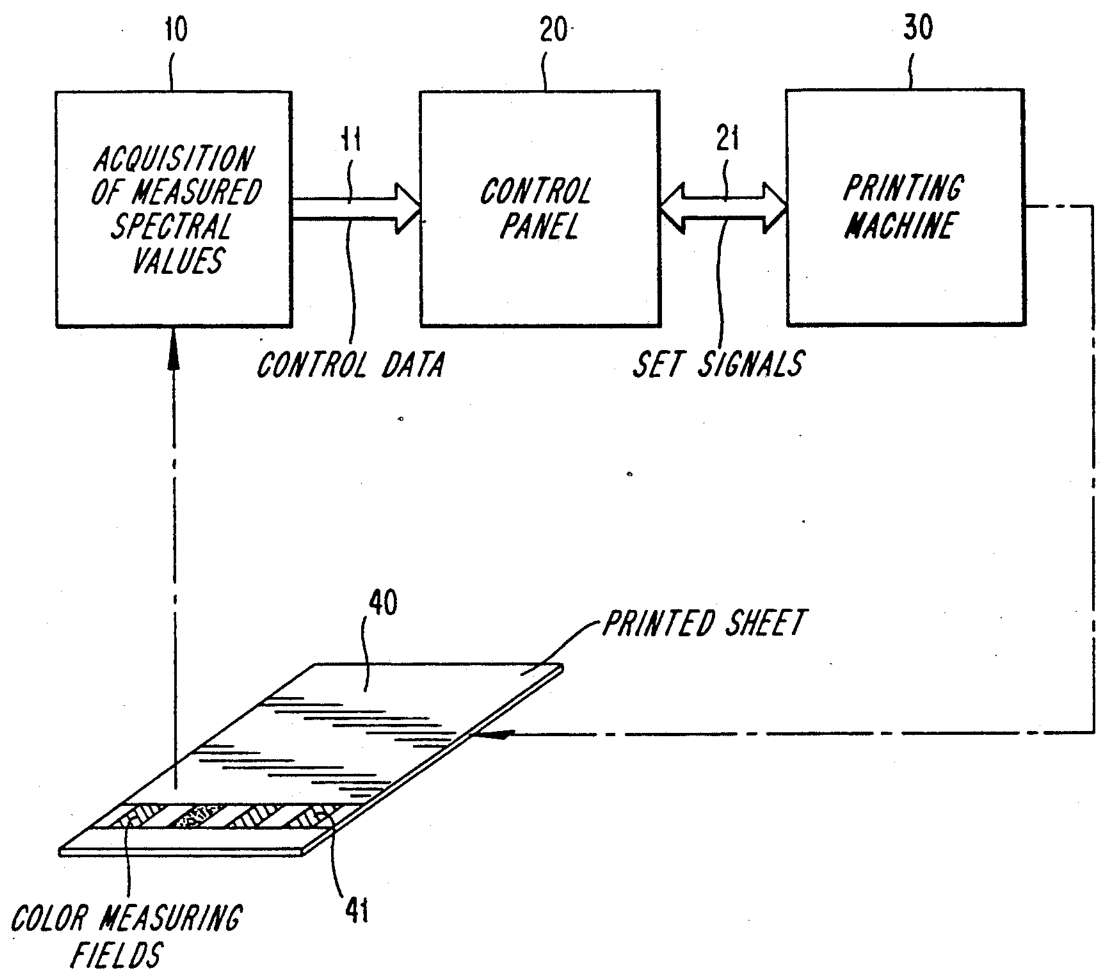
FIG. 1B is a simplified block diagram of a printing plant according to the invention.

In FIG. 1B, the printing plant shown corresponds generally to known installations of this type, and comprises a measured value acquisition device 10, a control panel 20 and a printing machine 30 equipped with a remotely controlled ink regulation apparatus. The configuration of FIG. 1B is generally known in the art, and corresponds, for example, to that of U.S. Pat. No. 4,200,932, the disclosure of which is hereby incorporated by reference.

Printed sheets 40 produced by the printing machine 30 are measured by photoelectric means in a series of test areas, for example in approximate preselected locations in the printed image or in an area of simultaneously printed color measuring fields 41. Control data 11 are determined from the measurements obtained in this manner, said control data corresponding to the color deviations of the printing inks used in printing the individual printing zones. The data 11 are fed into the control panel 20 as input values. The control panel 20 produces from the control data 11 adjusting signals 21 which regulate the ink control elements of the printing machine 30 in a manner such that color deviations are minimized.

Figure 2:
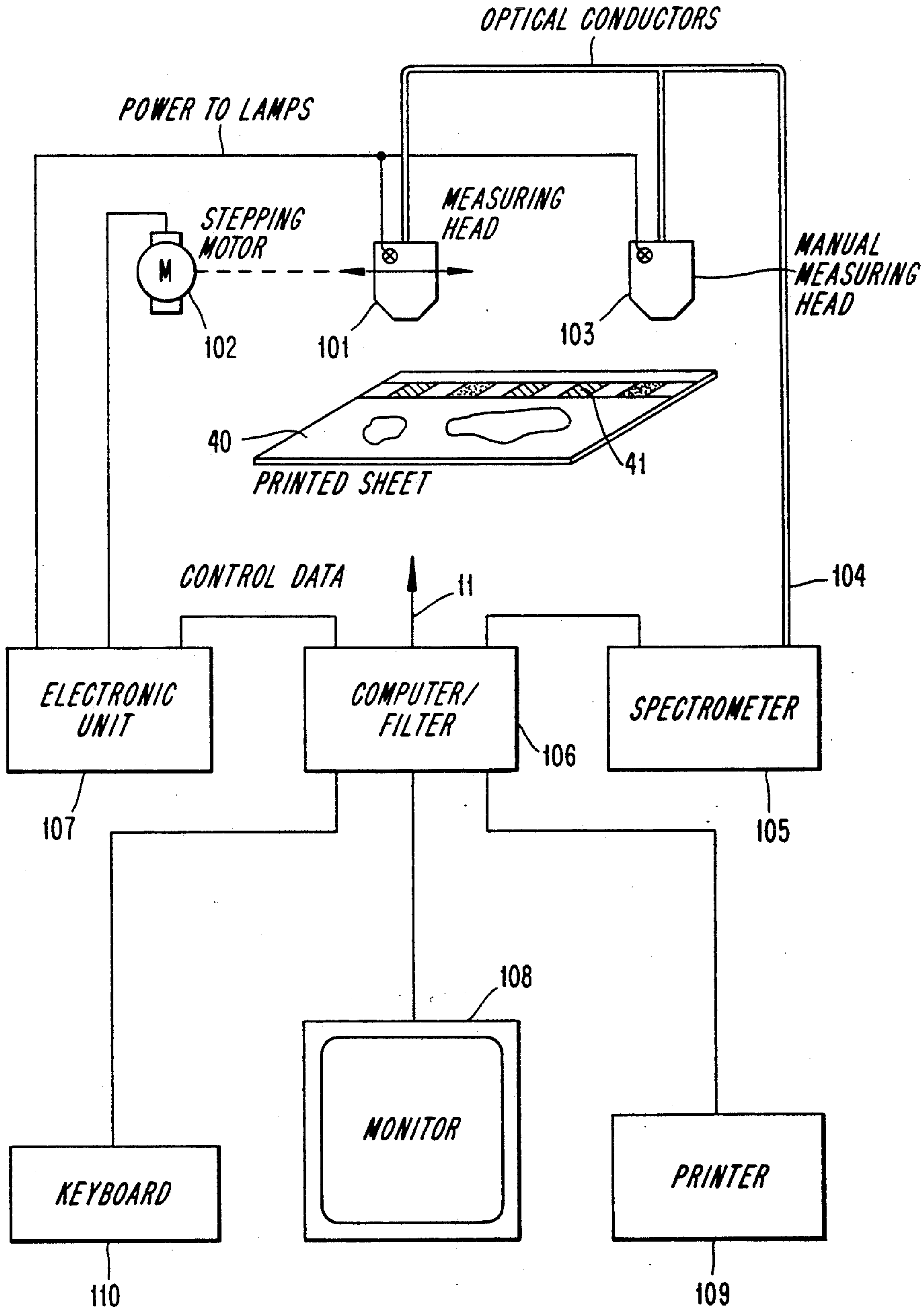
FIG. 2 is a block diagram of the measured value acquisition section of the plant according to FIG. 1B.

FIG. 2 shows the configuration of the measured value acquisition apparatus. It largely corresponds to the apparatus described in U.S. Pat. No. 4,505,589, the disclosure of which is hereby incorporated by reference, so that the following description is concentrated mainly on aspects in accordance with the present invention.

As shown in FIG. 2, the acquisition apparatus 10 comprises a measuring head 101 which is movable, for example by means of a stepping motor 102, relative to the printed sheet 40 to be measured. A manually moveable measuring head 103 is additionally provided; the head 103 may be positioned manually on the desired test area of the printed sheet. The two measuring heads 101 and 103 contain a measuring device, not shown, which illuminates the test area, captures the light reflected by the test area at 90° and couples it into an optical conductor 104 which guides the reflected light to a spectrometer 105. The illumination of the test area may be provided at the customary angle of 45° and it will also be understood that the reflected light may alternatively be conducted to the spectrometer by appropriate means other than the conductor 104.

The spectrometer 105 spectrally decomposes and measures the reflected lights. The measured data obtained in this manner are conducted to a computer 106 which as explained in more detail below, determines the control data 11 for the control panel 20. As already known, the computer 106 also controls an electronics unit 107 for driving the stepping motor 102, powering the light sources in the measuring heads 101 and 103 and controlling a data display device 108, a printer 109 and a keyboard 110. An important aspect of the measured value acquisition apparatus 10 according to the present invention is that spectral analysis of the test areas is used for colorimetric analysis, while the known densitometric apparatus merely measures the opacity of the test area. The known apparatus thus does not perform true color measurements/colorimetry. Another important aspect of the present invention relates to the evaluation of the spectral measurement data in the control of the inking process.

Figure 3:
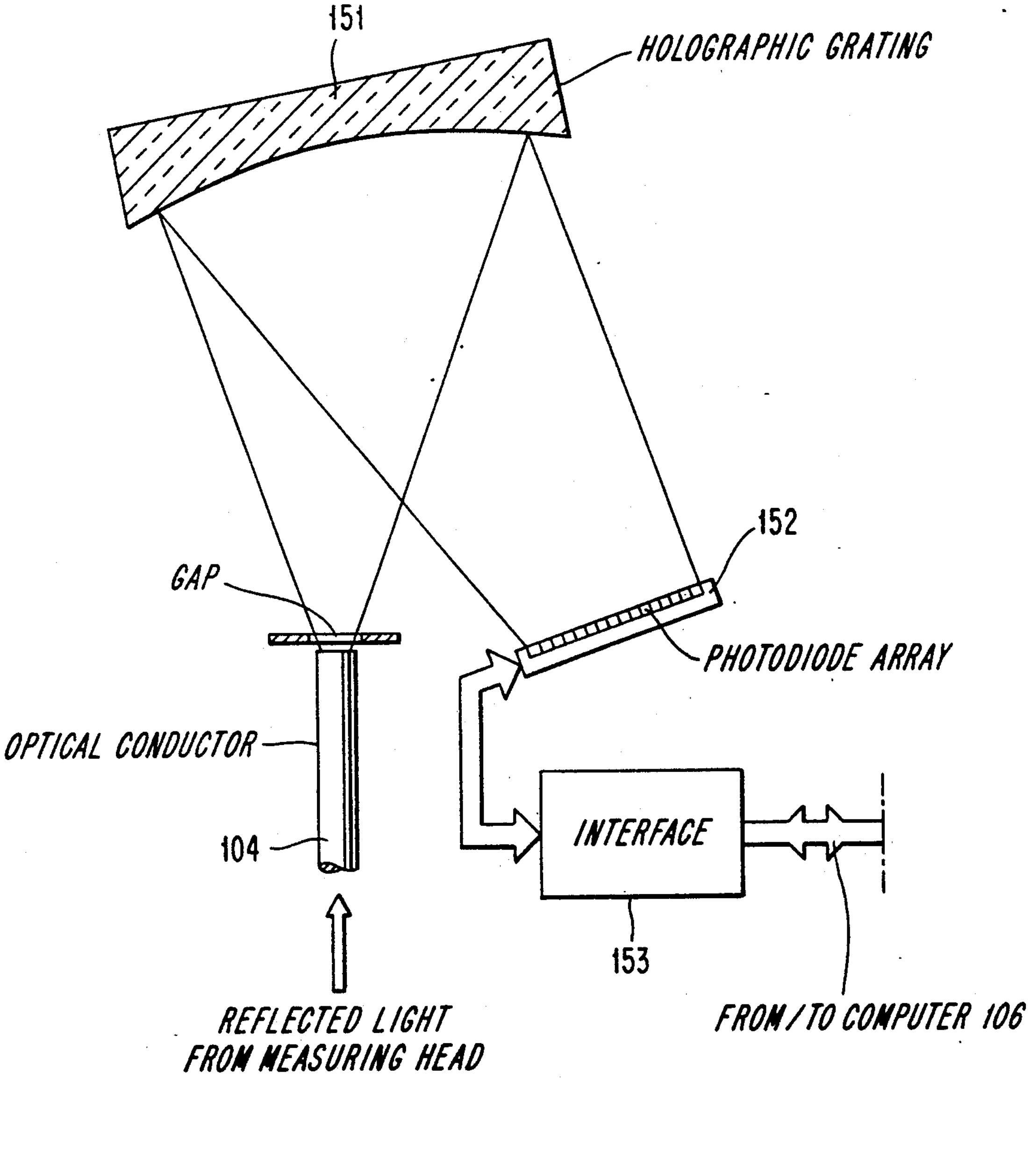
FIG. 3 is a schematic diagram of a detail of FIG. 2.

FIG. 3 shows a known configuration of the spectrometer 105. Such a configuration is similar to that disclosed in U.S. Pat. No. 4,076,421, the disclosure of which is hereby incorporated by reference. The measuring light conducted by the optical conductor 104 or other appropriate means from one of the measuring heads 101 and 103 enters the spectrometer through an inlet gap, and illuminates a holographic grating 151. The light is thus spatially divided according to its wavelength. The light spectrally decomposed in this manner is incident on a linear array of photodiodes 152 in a manner such that each photodiode is exposed to an individual, relatively narrow wavelength range. For example, the array may include 35 diodes. The measuring signals produced by the 35 photodiodes thus correspond to a 35 point spectral distribution of the measuring light. An interface unit 153 amplifies and digitizes the measured signals output from the diodes 152, thereby bringing them into a form intelligible to the computer 106. It will be understood that the interface unit 153 could also be located in the computer 106.

The measured value acquisition apparatus 10, the control panel 20 and the printing machine 30 are linked in a closed-loop control circuit. In the systems known heretofore, regulation of the inking process has been carried out according to densitometric, i.e. opacity, measurements of the printing colors involved. If there are deviations from the corresponding set density values, they are regulated out by the control panel through a corresponding adjustment of the ink control elements, i.e. the deviations are nullified or reduced to a permissible tolerance range. The control of the inking process is thus based on color density, but for the aforementioned reasons, this known method of inking control is not always fully satisfactory.

According to the present invention, the principle of inking controls regulated solely by color density is abandoned and replaced by regulation of inking controls based on spectral color measurements and colorimetry. For each test area (for example each color measuring field) the spectral reflection is determined by spectral measurements and the spectral reflections are converted by digital filtering into color coordinates of a selected color coordinate system wherein each set of coordinates uniquely defines a particular color. The measured color coordinate values are then compared with the corresponding set color coordinates of a reference in the same color coordinate system to determine color coordinate deviation. The inking process is then controlled by the color deviations and not by deviations of mere color densities. Preferably, the control is effected with the requirement that the total color deviation of a printing zone resulting from the sum of the color deviations, e.g., the sum of the absolute values or squares of the deviation, should be minimal. Also, each test area and correspondingly its color deviation may optionally be taken into account with each test area's deviation given an individual weighting. Weighting refers to the multiplication of the deviation for each of the various test areas by a particular weighting factor.

The color coordinate system upon which color measurements are based is in itself arbitrary. Preferably, however, the $L^*a^*b^*$ system or the $L^*u^*v^*$ system of CIE (Commission Internationale de l'Eclairage) is used. The color position is defined hereinafter as the coordinate triplet ($L^*$, $a^*$, $b^*$) or ($L^*$, $u^*$, $v^*$) and the color deviation is given by the vectors $\Delta E_{Lab}$ or $\Delta E_{Luv}$ or the individual components $\Delta L^*$, $\Delta a^*$, $\Delta b^*$ or $\Delta L^*$, $\Delta u^*$, $\Delta v^*$ of these vectors. It should be noted that the proper notation for the color coordinates is as shown above with the asterisk (e.g., $L^*$). However, the asterisk is omitted for simplicity hereinafter.

The set or reference values of the color coordinates, i.e. the set color positions, by which the color deviations for the individual test areas are calculated, are fed into the measured value acquisition apparatus 10; for example the set values may be manually input by means of the keyboard 110. It is, however, simpler and more convenient to measure the proof, substitute proof or whatever else is to be used as the reference image with the present apparatus itself and to input the measured values or the data calculated from them as the corresponding set values, storing them in a memory. The same is true for the color density set values used in connection with the superposed, density dependent controls to be described further below.

For reasons of easier comprehension on the one hand and compatibility with existing printing equipment on the other, the entire control system is distributed for description over the two components of the measured value acquisition apparatus 10 and the control panel 20. The control signals 11 generated by the measured value acquisition apparatus 10 in accordance with one embodiment of the present invention are of the same nature as those used in the already known color density measuring devices, so that the measured value acquisition apparatus 10 may be connected directly with the aforementioned known control panel 20. Thus, only the measured value acquisition apparatus needs to be replaced to refit a suitable printing plant for the process according to the present invention. It will be understood, however, that it is readily possible to directly generate the ink feed control signals needed for eliminating the color deviations determined by the measured value acquisition apparatus without performing the separate step of producing compatible density deviation signals. Rather, the necessary electric circuits in another appropriate manner can be combined or integrated into a single apparatus to produce the ink feed control signals directly from the color deviation signals. The division of the control system described below should therefore be understood merely as an example, although it is very close to that used in actual practice.

The computer 106, as mentioned above, calculates for every test area the color deviation vector $\Delta E_n$. Each of these vectors $\Delta E_n$ is then weighted with a weight factor $g_n$, so that each of the test areas may be considered individually. Test areas typical of the image will be given greater weights, while those of lesser importance will be weighted less.

It is also possible to eliminate weighting and to treat all of the test areas equally, or to include from the beginning only certain test areas in the control process. The weight factors also may be entered interactively by means of the keyboard 110 or they may be preprogrammed.

The weighted or optionally non-weighted color deviation vectors of the individual measuring fields are each multiplied mathematically with a transformation matrix which may be determined empirically. By taking into account certain quality criteria a color density variation vector is obtained, the components of which consist of the density variations or layer thickness variations of the printing colors involved in the printing. The color density variation vector therefore represents the control data for the printing zone under consideration and acts to alter the setting of the ink control elements so that the total color deviation—determined as the sum of the absolute values or the sum of the squares of the individual color deviations—will be at a minimum. This total color deviation may also serve as a quality measure for the print.

The elements of the transformation matrices are essentially the partial derivatives of the color coordinates from the color densities of the printing inks involved. They may be determined either empirically by measurements of corresponding test prints or synthetically by modelling.

For three-color printing the density variation vector has three components and its calculation from the color deviation vectors which also have three components is relatively uncomplicated. For example, let us assume that only one single test area is considered in each printing zone. The acquisition apparatus then produces the color spectrum of this test area; i.e., in the present case 35 measuring signals representing the spectral energy distribution of reflected light in 35 narrow wave length bands. These 35 measuring signals are now used to calculate the so-called color position of the color test field under test.

The color position is a triplet of color co-ordinates in a given color space (color co-ordinate system), such as the well known L, a, b -system mentioned above. In such a color system each existing color is attributed a unique color position or triplet of color coordinates.

Such color spaces or color systems are more suitable for color analysis and color comparison because they are much better matched to the visual impression than any other color quantifying system, particularly systems based on densitometric values.

The calculations necessary to obtain these color coordinates are straightforward and well described in the literature on the subject, e.g. in numerous publications of CIE (e.g., Commission Internationale de l'Eclairage, Publ. Nr. 15 (1971)) and other standard books of colorimetry. One such book is "Color in Business, Science and Industry", 3d edition, written by Deane B. Judd and Gunter Wyszecki (published by John Wiley & Sons, Inc., N.Y., 1975), the contents of which are hereby incorporated by reference. In particular, pages 129 through 159 of the book by Judd et al. disclose the determination of the color coordinates defining a particular color in a "tristimulus coordinate system" using spectral reflection. The "tristimulus coordinate system" is a standardized coordinate system which uniquely defines a set of color coordinates for each particular color, and is set forth specifically on page 142 of the book by Judd et al. Pages 281 through 352, of the book by Judd et al., and in particular pages 320 and 328, describe the manner in which the aforementioned L, a, b and L, u, v color coordinates are calculated from the "tristimulus coordinate system". It should be noted that in another embodiment of the present invention, the "tristimulus coordinate system" could be used to produce the color deviation data directly without the use of spectral measurements, for example, by using a tristimulus colorimeter described in Judd and Wyszecki referenced above.

The comparison between the color field under test and the corresponding reference color field is performed in the given color space yielding the color deviation triplet or vector E which is the basis of all further calculation steps. As the control panel 20 in one embodiment of the invention needs density deviations as input data rather than true color deviations as defined above, these color deviation data have to be converted into such density deviations. Although this can be done in several ways, one such way would be, as mentioned previously, to do it empirically. For example, if the three-component vector ΔE having the components ΔL, Δa and Δb (in, for example the L, a, b color coordinate system) is to be transformed into a density deviation vector ΔD having the components ΔC, ΔM and ΔY (C = ink density of Cyan, M = ink density of Magenta, Y = ink density of Yellow) then this can be written in form of a matrix equation $$\Delta E = Z \cdot \Delta D$$

wherein Z is a 3×3 transformation matrix. As mentioned above, the elements of the matrix Z must be the partial differentials of the elements of E with respect to the elements of ΔD, i.e. δL/δC, ΔL/δM, δL/ δY, δa/δc, δa/δM, etc. If the transformation matrix is known then the density deviation veotor ΔD can be calculated by simply inverting the above equation:

$$D = Z^{-1} \cdot \Delta E.$$

The problem thus reduces to the determination of the elements of the transformation matrix Z. This is easily performed empirically, e.g. according to the following procedure.

For the empirical determination of the elements of this transformation matrix Z, a normal colorimeter yielding colorimetric co-ordinate values of the given type and a normal densitometer yielding standardized color density values are needed. To determine the transformation matrix Z we have to print four images, each image being printed using a different ink feed setting (i.e., ink layer thickness) of the printing press wherein preferably the thickness of only one ink color is varied for each print. The first image printed is considered to be the reference image. For each of the second through fourth images, the ink feed settings are then varied. An arbitrary test area on each of the four printed images or test prints, most preferably a neutral grey test area containing all three printing inks, is then analyzed colorimetrically and suitable full-tone test areas each having only one single printing ink are measured densitometrically. The densitometric and colorimetric measuring data obtained from all four images are then input into the above matrix equation which can then be easily solved for the elements of the transformation matrix Z. It should be noted that in another embodiment, more than one matrix per measuring field could be used, with each matrix being determined for different ranges of ink settings of the printing machine.

The densitometrically measured full-tone color densities are denoted $C_0, C_1, C_2, C_3, M_0, M_1, M_2, M_3, Y_0, Y_1, Y_2, Y_3$, the indices standing for the number of the test print and the reference image (0), respectively. Similarly, the colorimetrically measured color co-ordinates are denoted $L_0, L_1, L_2, L_3, a_0, a_1, a_2, a_3, b_0, b_1, b_2, b_3$, the indices having the same signification. In this notation a deviation from a reference value can then be written as $\Delta C_1 = C_1 - C_0$, $\Delta C_2 = C_2 - C_0$. . . and $\Delta L_1 = L_1 - L_0$, $\Delta L_2 = L_2 - L_0$. . . a.s.o. The elements of the matrix Z are denoted $Z_{11}$. . . $Z_{33}$ in the usual manner.

Using the above basic matrix equation ΔE=Z·ΔD we can write in component form using the measuring values of the first 3 printing runs:

Using the Δ-notation and the matrix form this can be simplified to $$\begin{pmatrix} \Delta L_1 \\ \Delta L_2 \\ \Delta L_3 \end{pmatrix} = \begin{bmatrix} \Delta C_1 & \Delta M_1 & \Delta Y_1 \\ \Delta C_2 & \Delta M_2 & \Delta Y_2 \\ \Delta C_3 & \Delta M_3 & \Delta Y_3 \end{bmatrix} \cdot \begin{pmatrix} Z_{11} \\ Z_{12} \\ Z_{13} \end{pmatrix} = [\Delta V] \cdot \begin{pmatrix} Z_{11} \\ Z_{12} \\ Z_{13} \end{pmatrix}$$

$$\begin{pmatrix} \Delta a_1 \\ \Delta a_2 \\ \Delta a_3 \end{pmatrix} = \begin{bmatrix} \Delta C_1 & \Delta M_1 & \Delta Y_1 \\ \Delta C_2 & \Delta M_2 & \Delta Y_2 \\ \Delta C_3 & \Delta M_3 & \Delta Y_3 \end{bmatrix} \cdot \begin{pmatrix} Z_{21} \\ Z_{22} \\ Z_{23} \end{pmatrix} = [\Delta V] \cdot \begin{pmatrix} Z_{21} \\ Z_{22} \\ Z_{23} \end{pmatrix}$$

$$\begin{pmatrix} \Delta b_1 \\ \Delta b_2 \\ \Delta b_3 \end{pmatrix} = \begin{bmatrix} \Delta C_1 & \Delta M_1 & \Delta Y_1 \\ \Delta C_2 & \Delta M_2 & \Delta Y_2 \\ \Delta C_3 & \Delta M_3 & \Delta Y_3 \end{bmatrix} \cdot \begin{pmatrix} Z_{31} \\ Z_{32} \\ Z_{33} \end{pmatrix} = [\Delta V] \cdot \begin{pmatrix} Z_{31} \\ Z_{32} \\ Z_{33} \end{pmatrix}$$

By simple inversion of these 3 matrix equations the elements of the matrix Z are then found as:

$$\begin{pmatrix} Z_{11} \\ Z_{12} \\ Z_{13} \end{pmatrix} = [V]^{-1} \cdot \begin{pmatrix} L_1 \\ L_2 \\ L_3 \end{pmatrix};$$

$$\begin{pmatrix} Z_{21} \\ Z_{22} \\ Z_{23} \end{pmatrix} = [V]^{-1} \cdot \begin{pmatrix} a_1 \\ a_2 \\ a_3 \end{pmatrix}$$

$$\begin{pmatrix} Z_{31} \\ Z_{32} \\ Z_{33} \end{pmatrix} = [V]^{-1} \cdot \begin{pmatrix} b_1 \\ b_2 \\ b_3 \end{pmatrix}$$

wherein $[V]^{-1}$ is the inverse of [V] Thus, the empirical determination of the transformation matrix is relatively straightforward and can be performed by means of only four test printing runs and a few common mathematical matrix calculations.

Let us now proceed to the more complicated cases envisioned by the present invention wherein more than one single test field per printing zone is considered for the inking control. The FIG. 1B system is conceived to control the ink settings on the basis of one single set of density deviations (control signals 11) per printing zone.

In case of more than one test field, however, a corresponding number of density deviation sets is calculated.

Although in this case the operator of the printing machine could select a particular test field or the density deviation set determined therefrom, respectively and use this particular test field for the ink control, this would be nothing more than the above described trivial case. Another possibility would be to provide a weighted average of the density deviation sets to give a single set as mentioned above. In doing so, different weights could be given to the individual test fields according to their importance on the visual impression of the printed image as mentioned above. In the preferred embodiment, when the color deviations $\Delta E$ of a plurality of color test fields are determined, they are processed in a manner such that the total color deviation after the corresponding correction step of the printing press will be at minimum.

More specifically, when considering a plurality of test fields in a printing zone, one has to take into consideration that the transformation matrix Z is only valid for the particular test field for which it was determined. This is because different color test fields usually behave differently since they have a different sensitivity to ink layer thickness variations. In other words, for each individual color test field an individual transformation matrix has to be determined which, for these reasons, is often called "sensitivity matrix". As a result, an ink setting correction calculated on the basis of one individual color test field and yielding a perfect color match for this particular field usually causes imperfect color match (correction) for another individual color test field. Given a certain ink setting correction expressed in terms of density deviation $\Delta D$ (control signal 11) one can calculate the corresponding color deviation $\Delta E'$ resulting therefrom for each individual color test field using the individual sensitivity matrices $$\Delta E_i' = Z_i \cdot \Delta D$$

wherein the index i denotes the individual color test fields.

By multiplying each individual measured color deviation $\Delta E_i$ (before correction of the ink settings) using properly chosen individual factors $\Delta_i$ as discussed below, calculating the corresponding individual density deviations $\Delta D_i$ using the individual sensitivity matrices $Z_i$ as explained above and summing the $\Delta D_i$'s up, one can obtain a single set of density deviations $\Delta D$ yielding a "compromise" color correction such that the total color deviation (after the correction) is minimal. Total color deviation as mentioned above, refers to, for example, the sum of the absolute values or the sum of the squares of the individual color deviations of the individual color test fields (as compared with the desired individual reference color positions). All one has to do is properly determine the individual factors $\Delta_i$ using a common mathematical solution of a system of non-linear equations under a given boundary condition by iteration as discussed below.

In a case of more than three printing colors, the contributions of the individual test areas must be correlated logically in a suitable manner with the individual components of the density variation vector so that a correspondingly multidimensional variation vector is obtained.

As mentioned above, the set signals for the ink control elements may also be determined directly from the color deviations. Here again, the appropriate procedure is based on the criterion that the total color deviation must be minimized. As before, it is again possible to apply different weights to the individual test areas.

Figure 4:
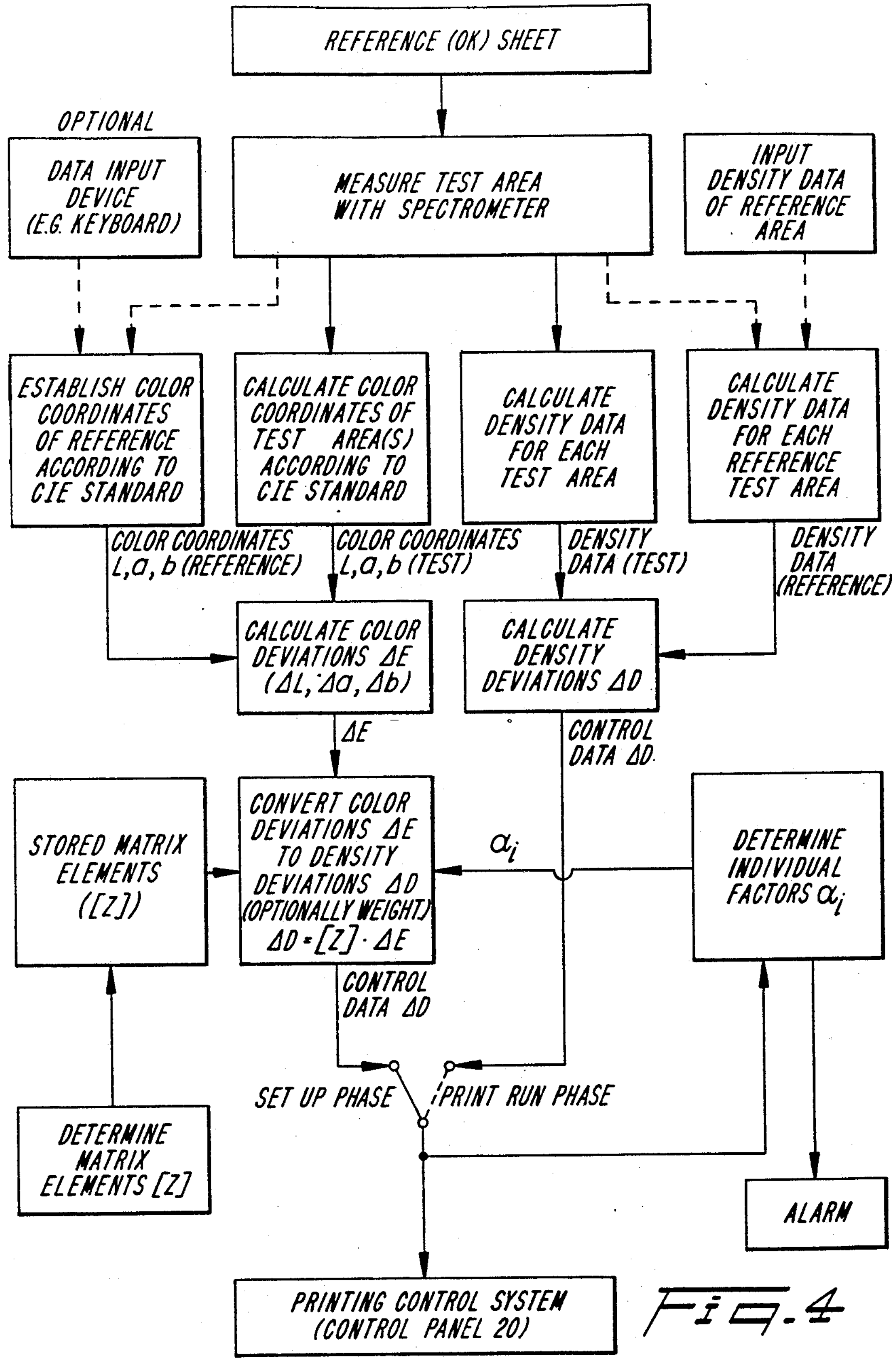
FIG. 4 is a flow chart of the operation of one embodiment of the present invention.
Figure 5:
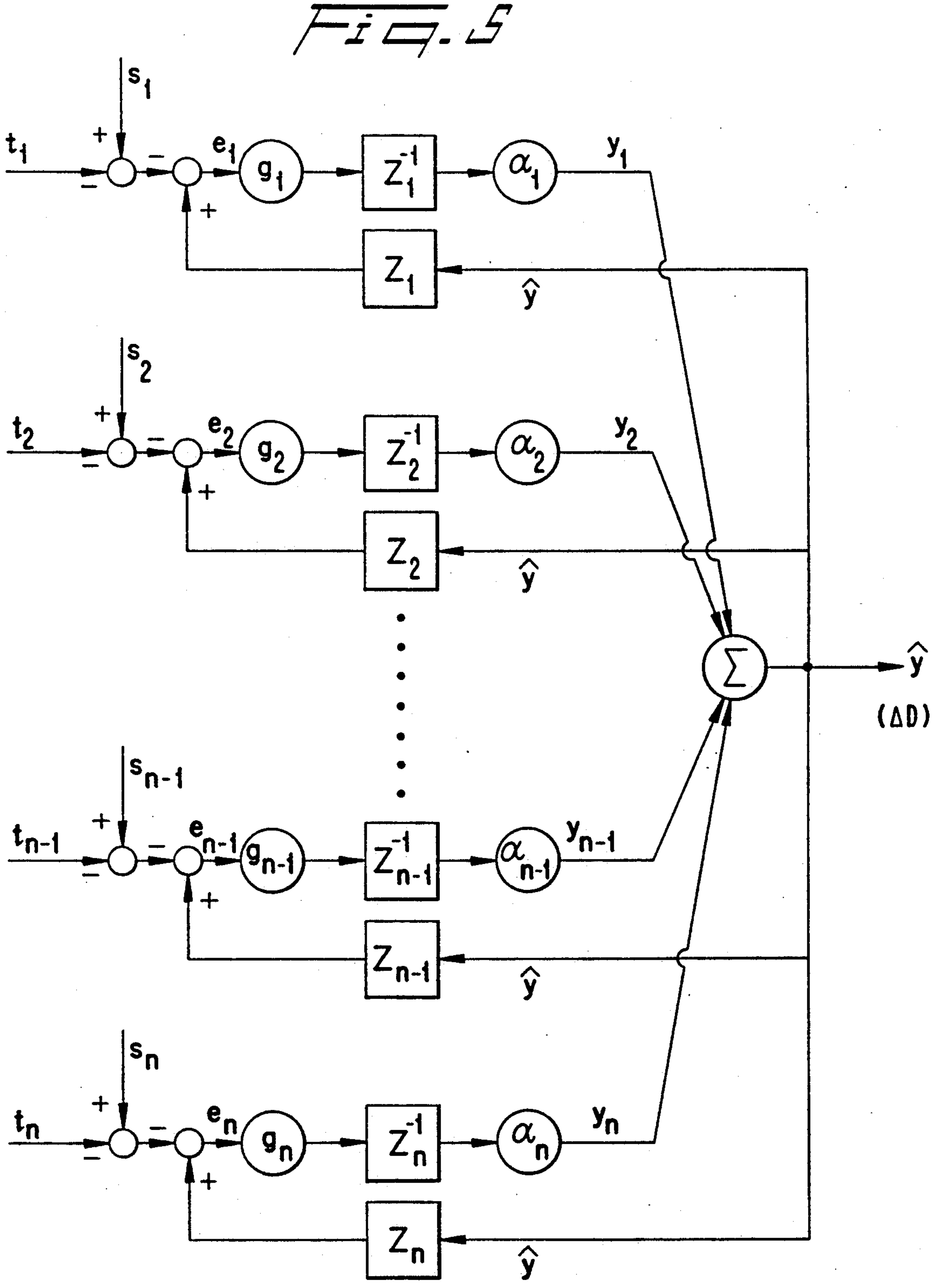
FIG. 5 is an exemplary model of the control system in one embodiment of the present invention.

The basic steps described above which would be executed, for example, by computer 106 of FIG. 2, are illustrated in FIG. 4. In addition, these steps can be expressed in the form a mathematical model as shown in FIG. 5 wherein the characters n, i, t, s, e, g, Z, $\alpha$, y and $\hat{y}$ have the following significations:

| | |
|---|---|
| n | number of test fields under consideration |
| i | index for individual test field |
| $t_i$ | measured color position vector for test field no. i |
| $s_i$ | reference color position vector for test field no. i |
| $g_i$ | weighing factor (scalar) for test field no. i |
| $z_i$ | sensitivity matrix for test field no. i |
| $\alpha_i$ | parameter (scalar) for test field no. i (to be calculated so as to fulfill boundary condition) |
| yi | density deviation vector for test field no. i |
| $\hat{y}$ | (total) density deviation vector $\Delta D$ |
| $e_i$ | residual density deviation vector for test field no. i |

As is clear from the discussion above, each individual residual density deviation vector $e_i$ results, on the one hand, from the color deviation of the current (measured) color position vector $t_i$ from the respective reference color position $s_i$ and, on the other hand, from the change of color position caused by the correction step on the basis of the calculated (total) density deviation vector $\hat{y}$:

$$e_i = s_i - t_i + Z_i \cdot \hat{y} \tag{1}$$

The individual density deviation vectors $y_i$ results from $e_i$ according to $$y_i = e_i \cdot g_i \cdot Z^{-1}_i \cdot \alpha_i \tag{2}$$

(If no individual weighting of the test fields is desired the factors gi are all equal or unity.) Equations (1) and (2) have to be solved for $\alpha_i$ under the boundary condition $$\sum_{i=i}^{n} (|e_i| \cdot g_i)^2 = \min. \tag{3}$$

The (total) color density deviation vector $\hat{y}$ (or $\Delta D$) is the sum of the individual density deviation vectors $y_i$:

$$\hat{y} = \sum_{i=1}^{n} y_i = \sum_{i=1}^{n} \alpha_i \cdot g_i \cdot Z_i^{-1} e_i = \sum_{i=1}^{n} \alpha_i \cdot g_i \cdot Z_i^{-1} \cdot [(s_i - t_i) + Z_i \cdot y] = \tag{4}$$

$$\hat{y} = \sum_{i=1}^{n} y_i = \frac{\sum_{i=1}^{n} \alpha_i \cdot g_i \cdot Z_i^{-1} \cdot (s_i - t_i)}{1 - \sum_{i=1}^{n} \alpha_i \cdot g_i} \tag{4a}$$

Substituting $\hat{y}$ in (1) by (4*a*) yields the following system of non-linear equations with $\alpha_i$ as unknown variables:

$$e_i = s_i - t_i + Z_i \cdot \frac{\sum_{j=1}^{n} \alpha_j \cdot g_j \cdot Z_j^{-1} \cdot (s_j - t_j)}{1 - \sum_{j=1}^{n} \alpha_j \cdot g_j} \tag{5}$$

wherein j is a summing index as i. For convenience a residual ri is defined according to $$r_i = |e_i| \cdot g_i \quad (6)$$

From (5) it is clear that the $e_i$'s are functions of the unknown parameters $\alpha_1 \ldots \alpha_n$, all other quantities being known. Thus the residuals $r_i$ are also functions of $\alpha_i$ which can be written as $$r_i = f_i(\alpha_1 \ldots \alpha_n) \quad (6a)$$

wherein the $f_i$ are defined by equations (5) and (6). Using (6) the boundary condition (3) reads $$\sum_{i=1}^{n} r_i^2 = \text{min.} \quad (3a)$$

The system of non-linear equations (6*a*) has to be solved for $\alpha_i$ under the boundary condition (3*a*). As an analytical solution would be quite tedious if not impossible the equations are best solved in praxi numerically by iteration according to standard methods of numerical mathematics.

To this end the equations are first linearized by expansion into series in the proximity of an arbitrary starting value (zero order approximation) $\alpha_{i0}$ for each parameter $\alpha_i$ and disregarding the higher order elements.

$$r_i(\alpha_1 \ldots \alpha_n) = f_i(\alpha_1 \ldots \alpha_n) = \quad (7)$$

$$= f_i(\alpha_{10} \ldots \alpha_{n0}) + \sum_{j=1}^{n} \Delta\alpha_j \cdot \frac{\gamma f_i(\Delta_{10} \ldots \alpha_{n0})}{\gamma \alpha_j}$$

Using the abbreviations $$r = \begin{pmatrix} r_1(\alpha_1 \ldots \alpha_n) \\ r_2(\alpha_1 \ldots \alpha_n) \\ \cdot \\ \cdot \\ \cdot \\ r_n(\alpha_1 \ldots \alpha_n) \end{pmatrix} \quad (8)$$

$$X = \begin{pmatrix} \Delta\alpha_1 \\ \Delta\alpha_2 \\ \cdot \\ \cdot \\ \cdot \\ \Delta\alpha_n \end{pmatrix}$$

$$y = (-1) * \begin{pmatrix} f_1(\alpha_{10} \ldots \alpha_{n0}) \\ f_2(\alpha_{10} \ldots \alpha_{n0}) \\ \cdot \\ \cdot \\ \cdot \\ f_n(\alpha_{10} \ldots \alpha_{n0}) \end{pmatrix}$$

$$A =$$

-continued $$\begin{pmatrix} \frac{\gamma f_1(\alpha_{10} \ldots \alpha_{n0})}{\gamma \alpha_1} & \ldots & \frac{\gamma f_1(\alpha_{10} \ldots \alpha_{n0})}{\gamma \alpha_n} \\ \cdot & & \cdot \\ \cdot & & \cdot \\ \cdot & & \cdot \\ \frac{\gamma f_1(\alpha_{10} \ldots \alpha_{n0})}{\gamma \alpha_1} & \ldots & \frac{\gamma f_n(\alpha_{10} \ldots \alpha_{n0}}{\gamma \alpha_n} \end{pmatrix}$$

equation (7) can be rewritten in the general form $$r = A \cdot x - y \quad (9)$$

According to any standard book of matrix calculation this type of matrix equation together with boundary condition (3*a*) has the general solution (cf. so-called "Least Square Fit Method" see e.g. Flury-Riedryl, "Angewandte Multivariate Statistik", G. Fischer Verlag, Stuttgart, N.Y.).

$$x = [A^T \cdot A] \cdot^{-1} \cdot A^T \cdot y \quad (10)$$

wherein $A^T$ is the transposed matrix of A. Using (10) $\Delta\alpha_1 \ldots \Delta\alpha_n$ can be determined yielding the first order approximation for $\alpha_1 \ldots \alpha_n$ according to $$\alpha_{i1} = \alpha_{io} + \Delta\alpha_i \quad (11)$$

These values can be put into equations (7)–(10) to replace the zero order approximations (start values) thus yielding the second order approximations for $\alpha 1 \ldots \alpha_n$:

$$\delta_{i2} = \alpha_{i1} + \alpha_i \quad (12)$$

These steps are iteratively repeated yielding ever closer approximations for $\alpha_1 \ldots \alpha_n$ according to the general formula $$\alpha_{ik+1} = \alpha_{ik} + \Delta\alpha \quad (13)$$

Iteration is stopped when successive $\alpha_{ik}$ do not substantially differ, i.e. when $|x| \leqq E$, the latter being an arbitrary small threshold value.

The values $\alpha_i$ calculated according to the above explained method are then used for the calculation of ΔD using formula (4*a*) above.

The printing process is usually carried out in three phases. The first phase consists of the more or less rough presetting of the printing machine, for example based on the measured values of printing plates. This is followed by the so called setup phase (fine setting, register) wherein the ink controls are adjusted using the proofs or proof substitutes in one way or another until the printed product is satisfactory. Finally, the third phase is the printing run, in which the intent is to adjust the controls so as to maintain the result obtained by the setup phase as constant as possible. Customarily the reference used for this is not the proof or the like, but a printed sheet found to be satisfactory, i.e., the so-called OK sheet; the printing run is regulated for constant densitometrically determined color densities.

The density regulation phase in the printing run phase may be carried out in a very simple manner by the printing plant according to the present invention. It is merely necessary to convert the measured spectral reflections to filtered color densities corresponding to a densitometer and then to compare them with the set color density values determined from an OK sheet. The differences between the measured and the set color densities then immediately represent the control data 11 for the control panel 20.

In another embodiment of the process according to the present invention however, the printing machine may be set up as described using color deviation controls with the printing run being stabilized in the conventional manner using color densities as shown in FIG. 4. A particular advantage of the present invention is that the determination of color densities may be based on arbitrary filter characteristics, whereby a high degree of flexibility of the plant is obtained. Therefore, during the run phase, inking can be regulated for constant full-tone densities densitometrically determined in the usual way. This phase can thus be carried out in a very simple manner in the inventive process, by merely mathematically converting the spectral reflection values to corresponding filtered color densities according to the standard formulae of densitometry. These conversion formulae can be found in any standard book of densitometry (see e.g., DIN 16536, Nov. 1982). In this mode of operation of course ink control is performed exactly as in conventional prior art methods with the exception that the color densities are calculated from the spectral reflectance values rather than measured densitometrically.

According to another advantageous embodiment, the two control principles may be superposed upon each other, that is, during printing run stabilization controlled by means of color densities, the total color deviation is also determined and monitored. If the overall color deviation should exceed for some reason (for example variations of the printing process due to rubber blanket contamination, etc.), a predetermined limiting value, a suitable reaction may be invoked. For example, a new color-deviation-controlled correction of the printing machine may be carried out, whereby simultaneously the set color density values are updated for further printing run stabilization; it is also possible to produce merely an indication of printing error.

The total color deviation may be considered a measure of quality and optionally displayed or printed out along with measured spectral data, spectral reflections and color position coordinates.

An important element of standardized print monitoring is the color measuring strip. The raster tones are to appear adapted to different color and tone value combinations or to particularly critical tones. It is also possible to include critical tones from the subject image into the measuring strip.

Experience shows that subjects may divided into groups as a function of color, for example furniture catalogs (the quality of which is determined by brown tones), cosmetics prospectuses and portraits, in which skin tones are dominant. There are also groups in which for example gray or green tones are prevalent. Correspondingly, specific color-oriented color measuring strips may be constructed and purposefully applied. In this manner, the image-determining areas may be taken into account in a simple manner.

In proof or proof-substitute printing, controls are not always based on zones. It is sufficient in this case to print simultaneously one measuring field of each field type and to establish these as set values for the entire width of the printed sheet or parts thereof.

On a production printed sheet with zonal ink control each zone may be monitored individually. Measuring fields important for ink control, such as single color measuring fields for the density controlled regulation of the inking process and multicolor halftone fields for colorimetric regulation, must therefore be repeated with the closest possible spacing. Control fields for ink uptake, tone value increments, etc. may be mounted at somewhat larger distances.

In three-color printing the printable color space is limited by the color positions of paper white, the single-color full tones and the 2- and 3- color full-tone overprints (white, cyan, magenta, yellow, red, green, blue, black). Although not all color deviations may be equalized simultaneously in all color tones during printing, it is possible to optimize the mean color deviations. It is therefore convenient to use, in addition to color-density-controlled regulation for the color-deviation controlled ink control, suitable 2-or or 3- color halftone fields, such as gray balance fields or subject-dependent delicate tones.

In four-color printing, blackening is produced by 3 colors and/or by black. As measuring fields for color-position controlled regulation, halftone fields with black or 2 or 3 colors may also be of interest. Color tones are chosen preferably from critical areas of the printing space. If four-color halftone fields are used, one color must be predetermined as a free parameter and measured additionally on a separate color measuring field.

For special colors, suitable color measuring fields may be determined in keeping with similar considerations and depending on the subject.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Process for controlling the application of ink by a printing machine comprising the steps of:

photoelectrically measuring a printed sheet printed by the machine in a plurality of printed test areas;

determining, from said measured test areas, color positions of the test areas relative to a selected color coordinate system wherein a unique color position exists for each measured color;

establishing reference color positions according to the selected color coordinate system;

determining color deviations between the color positions of the test areas measured and corresponding reference color positions;

calculating control data on the basis of said individual color deviations; and automatically controlling the inking process on the basis of said calculated control data.

2. Process according to claim 1, wherein the control data are calculated by minimizing the color deviations of selected test areas.

3. Process according to claim 1, wherein the control data are calculated by minimizing a total color deviation resulting from the individual color deviations.

4. Process according to claim 1, further including the steps of applying individual weighing factors to the individual color deviations and determining a total color deviation based on the individual weighted deviations.

5. Process according to claim 1, wherein the control data are calculated for an individual zone of a printed image from color deviations of test areas belonging to the printing zone involved.

6. Process according to claim 5, wherein the control data are calculated from color deviations of zone overlapping test areas.

7. Process according to claim 6, further including the step of applying weighting factors to the individual color deviations wherein the weighting factors differ over the print width by zones.

8. Process according to claim 1, wherein the color positions are calculated from spectral values filtered using CIE-standard spectral curves.

9. Process according to claim 1, wherein the control data are calculated from filter color densities obtained by digital filtering of spectral reflections with selected color filter curves.

10. Process according to claim 1, wherein the printing machine is controlled during setup by matching a print with a master under color-deviation control and subsequently during a printing run control is carried out based on filter color densities in a manner such that said color densities are maintained essentially at constant set values.

11. Process according to claim 1, Wherein test areas in a form of simultaneously printed color measuring fields including multicolor halftone fields are used as color measuring fields.

12. Process according to claim 10, wherein photoelectric measurements are monitored during a color density controlled printing, said monitored measurements being used to adjust set density values.

13. Process according to claim 10, wherein the total color deviation is also calculated and monitored during the printing run and a warning is issued when a color deviation tolerance is exceeded.

14. Process according to claim 12, wherein the total color deviation is also calculated and monitored during the printing run and a new color-deviation-controlled correction of the printing machine is carried out when a color deviation tolerance is exceeded.

15. Process according to claim 1, wherein color measuring fields are used having color tones corresponding to selected critical image areas of the printed sheet.

16. A printing plant, comprising:

a printing machine;

an acquisition apparatus for photoelectrically measuring a printed sheet; and a control apparatus for processing measured data produced by the acquisition apparatus and for automatically producing control signals for ink control elements of the printing machine in response to said measured data, wherein the acquisition apparatus is equipped for generating spectral photometric measurement data of the printed sheet at a plurality of different wavelengths as colorimetric data, and the control apparatus converts spectral photometric data produced by the acquisition apparatus into spectral reflections and color position coordinates for producing the set signals based on colorimetric deviations.

17. Printing plant according to claim 16, wherein the control apparatus determines the color deviations from calculated color coordinates by comparison with set color position coordinates and produces the control signals based on said color deviations.

18. Printing plant according to claim 17, wherein the control apparatus also converts the spectral photometric measured data produced by the acquisition apparatus to color densities and generates for the ink control elements corresponding set color densities from said converted spectral photometric measured data.

19. Printing plant according to claim 16, wherein indications of the measured spectral photometric data, the spectral reflections and color position coordinates are provided.

20. Measuring apparatus for producing color data for a printing machine comprising:

an acquisition apparatus for zonal photoelectric measuring of a printed sheet and for generating measured data; and a processing apparatus for processing the measured data and generating control data from said measured data, said control data representing color deviations of print sheet areas scanned by the acquisition apparatus from corresponding set values, said acquisition apparatus further including:

a spectrometer module for measuring the printed sheet at a plurality of different wavelengths by spectral photometrical means, and for converting measured data produced by the acquisition apparatus to spectral reflections and color position coordinates, said processing apparatus comparing the color position coordinates with set color position coordinates, determining a color deviation between said color position coordinates and said set color position coordinates and automatically generating the control data for the printing machine from said color deviations.

21. Measuring apparatus according to claim 20, wherein the processing apparatus converts the spectral photometric data produced by the acquisition apparatus to filter color densities, compares the filter color densities with set color densities, and generates the control data from a result of said comparison for the printing machine.

22. Measuring apparatus according to claim 20, wherein the acquisition apparatus measures test areas, and determines color positions of the test areas relative to a selected coordinate system wherein a unique color position exists for each measured color, and wherein the processing apparatus determines color deviations between the measured test area color positions and corresponding set color positions, and calculates color data on the basis of said color deviations.

23. Measuring apparatus according to claim 20, wherein the acquisition apparatus includes a controllably movable photoelectric color measurement head and a freely movable measurement head, whereby color measurements may be effected at any location and on arbitrary samples.

24. Measuring apparatus according to claim 23, wherein the freely movable measurement head uses the spectrometer module used by the controlled measuring head.

25. A process for controlling the inking process in a printing machine comprising the steps of:

(a) establishing desired reference color coordinates in a standardized color coordinate system wherein each coordinate value uniquely defines a particular color;

(b) measuring color spectral characteristics of a test area printed by the printing machine to establish measured color coordinates for said test area in said color coordinate system;

(c) determining a color deviation of said test area on the basis of the reference color coordinates and said measured color coordinates; and (d) automatically calculating inking control data on the basis of said color deviation for controlling the inking process of the printing machine.

26. The process according to claim 25, wherein the standardized color coordinate system is according to one of the CIE recommendations.

27. The process according to claim 25, wherein the step of calculating the inking control data includes the step of converting the color deviation, into a density deviation for controlling ink feed of the printing machine in response to the density deviation.

28. The process according to claim 25, wherein the step of establishing desired reference coordinates comprises measuring color spectral characteristics of a reference area and establishing the desired reference color coordinates in said standardized color coordinate system in response to said measured color spectral characteristics.

29. The process according to claim 27, wherein the step of converting comprises the step of empirically determining a plurality of values related to changes in color coordinates as a function of changes in density for a plurality of printed areas.

30. Process according to claim 25, wherein said measuring step further includes the step of measuring the color spectral characteristics of a plurality of test areas.

31. Process according to claim 25, wherein said step of determining further includes the step of determining plural color deviations between the color spectral characteristics of said test areas and reference color coordinates associated with each of said test areas, such that said inking process is controlled as a function of said plural color deviations.

32. An apparatus for producing inking control signals for a printing machine comprising:

means for establishing desired reference color coordinates in a standardized color coordinate system wherein each coordinate value uniquely defines a particular color;

means for measuring color spectral characteristics of a printed test area to establish measured color coordinates for said test area in said color coordinate system;

means for determining a color deviation of said test area in response to said reference color coordinates and said measured color coordinates; and means for automatically calculating inking control signals as a function of said color deviation for providing inking control signals.

33. Apparatus according to claim 32, wherein the color coordinate system is the L*a*b*.

34. Apparatus according to claim 32, wherein said calculating means further includes:

means for converting said color deviation into a corresponding set of standard filter density deviations.

35. Apparatus according to claim 32, wherein said measuring means further includes measuring a plurality of printed test areas and said determining means further determines color deviations with respect to a corresponding one of a plurality of reference color coordinates associated with each test area, and further includes:

means for summing all of the color deviations to determine a total color deviation.

36. Apparatus according to claim 35, wherein said inking control signals are produced by minimizing the color deviations of selected test areas.

37. Apparatus according to claim 35, wherein said inking control signals are produced by minimizing the color deviation of selected test areas.

* * * * *